Dec. 6, 1949     G. MARSDEN     2,490,696
DISPLAY SCALE WHEREIN A DRUM IS ROTATED BY
INITIAL MOVEMENT OF THE SCALE
Filed Nov. 2, 1945
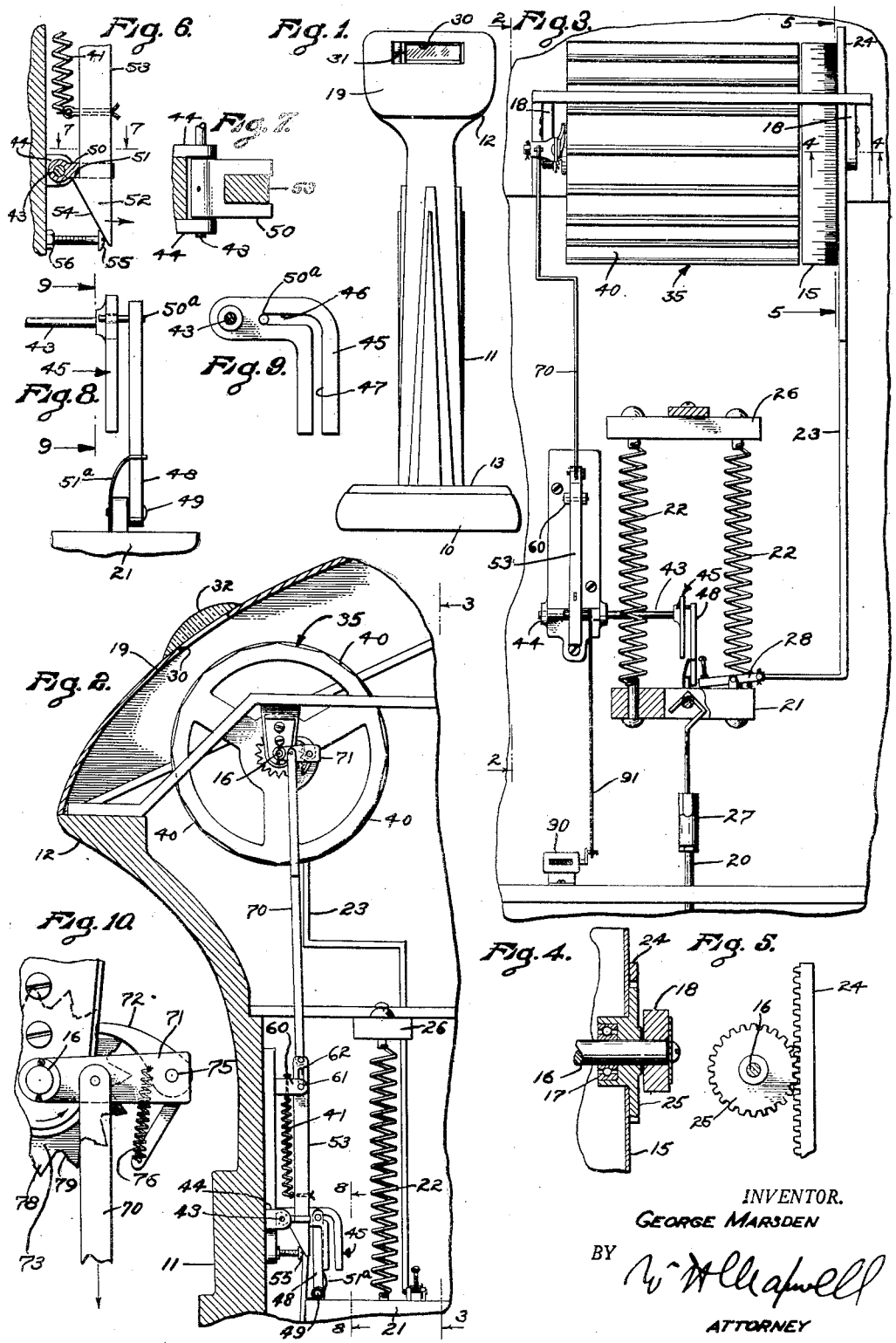
INVENTOR.
GEORGE MARSDEN
BY
ATTORNEY Patented Dec. 6, 1949

2,490,696

UNITED STATES PATENT OFFICE 2,490,696

DISPLAY SCALE WHEREIN A DRUM IS ROTATED BY INITIAL MOVEMENT OF THE SCALE

George Marsden, Los Angeles, Calif.

Application November 2, 1945, Serial No. 626,391

4 Claims. (Cl. 40—28)

This invention has to do with a display scale and it is a general object of the invention to provide a machine incorporating an effective display or advertising device and a weighing mechanism or scale working in conjunction therewith so that the two work simultaneously and in which the scale is accurate and dependable.

My present invention is an improvement upon the general type of device which is the subject of Letters Patent of the United States No. 2,107,674, issued to me February 8, 1938. In the said patent I disclose a mechanism wherein a display device is combined or directly related to the indicating element of the scale so that the final driving force operating the indicator also operates the display device. A disadvantage of this arrangement is that for an accurate scale the driving force is not sufficient to effectively drive or operate a practical display device.

It is an object of my present invention to provide a mechanism of the general character referred to wherein the display device is related to the scale mechanism so that the display device is operated only by the initial movement of the scale while the final movement of the scale is entirely free of the display device and, consequently, can be delicate and accurate.

Another object of my invention is to provide a mechanism of the general character referred to involving a simple, inexpensive yet dependable combination of parts. The device of the present invention involves few simple parts, inexpensive of manufacture and which are dependable and effective in operation.

The various objects and features of my invention will be fully understood from the following detailed description of a typical preferred form and application of the invention, throughout which description reference is made to the accompanying drawings, in which:

Fig. 1 is a front view of a typical platform scale embodying the present invention;

Fig. 2 is an enlarged sectional view of the upper portion of the scale showing the upper portion of the pedestal and a part of the head and a portion of the mechanism housed in the head and pedestal being a view taken substantially as indicated by line 2–2 on Fig. 3;

Fig. 3 is a view of the parts illustrated in Fig. 2 being a view taken substantially as indicated by line 3–3 on Fig. 2, certain parts being broken away to show in section;

Fig. 4 is an enlarged, detailed sectional view taken as indicated by line 4–4 on Fig. 3;

Fig. 5 is an enlarged, detailed sectional view taken as indicated by line 5–5 on Fig. 3;

Fig. 6 is an enlarged view of a part of the mechanism, being an enlarged sectional view of the part of the mechanism shown in the lower portion of Fig. 2;

Fig. 7 is a plan view taken as indicated by line 7–7 on Fig. 6;

Fig. 8 is an enlarged view of a portion of the mechanism shown in Fig. 3, being a view taken substantially as indicated by line 8–8 on Fig. 2;

Fig. 9 is a sectional view taken as indicated by line 9–9 on Fig. 8; and

Fig. 10 is a detailed view showing the final drive of the display device.

The device of the present invention can be applied to or incorporated in scales of various types or forms. It is, however, best suited for use in platform scales such as are commonly installed in public or semi-public places for the use of people desiring to ascertain their weight. The device may be applied to or incorporated in a scale which is coin controlled or otherwise regulated. However, I have for sake of simplicity illustrated it as applied to a scale which has no control of this kind.

The particular scale that I have disclosed as typical of a mechanism in which the present invention can be incorporated or to which the device of the present invention can be applied, involves, generally, a frame or body having a base 10, a pedestal or column portion 11 projecting upward from the rear end of the pedestal. A platform 13 is suitable mounted in the base 10 in the manner common to scale construction and is designed to carry the person or object being weighed. The pedestal 11 is preferably a hollow element tubular or hollow to accommodate various parts of the mechanisms that I am about to describe. The head 12 is on the upper end of the pedestal and may be in the nature of an enlargement or a hollow case carrying or housing certain parts of the mechanism, all as will be described.

The scale to which the invention is applied may further involve an indicator 15 which may vary widely in form. The indicator illustrated is in the form of a drum or graduated cylinder mounted on a suitable shaft 16 through anti-friction bearings 17. The shaft is supported by brackets 18 fixed in the head 12 so that the shaft extends horizontally through the head parallel with the front 19 of the head.

The scale illustrated further includes operating means connecting the indicator 15 and the platform 13. The operating means shown in the drawings involves a main or lower pull rod 20 operated from the platform through any suitable mechanism common to scale devices of this general character, a cross head 21 normally held elevated by a pair of springs 22, and a secondary or upper pull rod 23 which extends from the crosshead 21 to the vicinity of the indicator 15 and a connection between the rod 23 and the indicator. The connection between the rod 23 and the indicator 15 preferably includes a simple straight rack 24 on the upper end of the rod 23 meshing with and driving a gear 25 fixed to the indicator 15 concentric therewith. The springs 22 are carried by a fixed support 26 suitably located above the cross head 21 and the mechanism just described includes the usual adjusting means such as a turnbuckle 27 or the like in the rod 20, and an adjustable lever device 28 connecting the arm 23 with the cross head 21.

The mechanism thus far described is a typical or conventional scale mechanism and is a typical example of a device to which the present invention can be applied. With the mechanism just described when the platform 13 is depressed, as by a person standing on it the rod 20 is moved down against the resistance of the springs 22 thus causing the cross head 21 to move down. As the cross head moves down it carries the rod 23 with it and downward movement of the rod 23 rotates the indicator 15 through the rack and gear connection. This mechanism is relatively simple and reasonably accurate.

The scale includes, in addition to the parts just described, a sight opening 30 in the front 19 of the head 12 opposite the indicator 15 so the scale of the indicator can be seen and compared with a suitable reference mark 31, or the like. In accordance with conventional scale construction a transparent closure 32 is provided for the sight opening 30 and this closure may be in the form of a lens which magnifies the scale on the indicator.

The mechanism that I have provided, generally, a display device 35 preferably located in the vicinity of or adjacent the indicator 15 and a drive or operating connection between the display device 35 and the leverage system or mechanism of the scale whereby energy is taken from the scale mechanism only during its initial movement to drive the display device, and the display device is free to move or operate following initial movement caused by release of the energy taken from the scale mechanism.

The display device 35, as shown in the drawings, may be a drum rotatably mounted on the shaft 16 adjacent the indicator 15 to run free on the shaft just like the indicator 15 runs on the shaft. The exterior of the display device 35 may be of the same or substantially the same diameter as the indicator 15 and its surface may be occupied by sections or panels 40 suitable for carrying advertising matter, or the like. When this form of display device is used it is preferred to extend the sight opening 30 so that the display device is visible to one looking at the indicator 15. For instance, as shown in the drawings, the sight opening and its closure are extended to project substantially beyond the indicator 15 and behind the extended portion of the sight opening and its closure is the display device 35, so that one or more of the panels or portions 40 of the display device can be seen by a person viewing the indicator 15.

The present invention contemplates taking energy from the scale mechanism preferably at a point where there is a substantial amount of energy and so that it will not interfere with the balance or action of the scale. In the preferred arrangement I take the energy from the cross head 21 of the scale mechanism and store it in a spring 41 to be released so that it drives the display device. In the particular form of the invention illustrated the mechanism involves an oscillating shaft 43 supported in suitable bearing brackets 44. A cam member 45 is carried on the shaft 43 and has a cam slot formed in it with a radially extending portion 46 which communicates at its outer end with a tangential portion 47. A lever 48 is carried by a pivot pin 49 mounted on the cross head 21 and an operating pin 50ª projects from the lever 48 and operates in the slots 46 and 47 of the cam 45. A suitable spring 51ª is provided to normally yieldingly urge the lever 48 in a direction to cause the pin to normally tend to move toward the shaft 43. The parts of the mechanism just described are arranged and related so that when the scale is in the normal or unactuated position the radial portion 46 of the cam slot extends substantially horizontally while the tangential portion 47 of the slot extends downwardly. During the first or initial movement of the scale the lever 48 is carried down by the cross head and the pin 50ª bears down on the lower wall of the slot portion 46 thus causing the shaft 43 to rotate. This continues until the angle of the slot portion 46 is downward sufficient to allow the pin 50ª to slip out of the slot portion 46 and enter the portion 47 where it is free to move downward. Through this arrangement during the initial operation of the scale the shaft 43 is rotated a predetermined amount whereafter the scale is freed to move further and as it moves further the indicator 15 is operated in the usual manner and its operation is in no way interfered with or impaired by the mechanism that I have provided.

The shaft 43 carries an arm 50 which normally projects horizontally but which is swung or turned downwardly as the shaft 43 is rotated in the manner just described. The arm 50 engages the shoulder 51 of a latch head 52 provided on the lower end of a rod 53. The latch head 52 has a cam surface 54 which cooperates with a fixed abutment 55 which is preferably adjustable and set in position by a lock nut 56. The parts are arranged and related so that as the arm 50 rotates downward due to rotation of the shaft 43 the latch head 52 is moved downward carrying the rod 53 with it. As the latch head and rod move downward the abutment 55 cooperating with the cam surface 54 causes the latch head to be moved out, as indicated by the arrow in Fig. 6, and just before the arm 50 reaches the end of its turning movement the arm 50 disengages from the shoulder 51 releasing the latch head from the arm.

The storage spring 41 is connected to the bar or rod 53 and normally yieldingly urges it upwardly. The spring 41 is a tension spring connected to a fixed bracket 60. As the bar 53 moves downward the spring 41 is extended and thus energy is stored in it to be released when the latch head 52 is released from the arm 50.

The rod 53 is slidably pivotally supported for limited vertical movement and for the necessary pivotal movement. In the arrangement illustrated a pivot pin 61 is carried by the bracket 60 which also carries the spring 41 and operates in a slot 62 provided in the rod 53. The slot and pin cooperate to allow the rod to pivot or swing in the desired manner, and also to move vertically in the desired manner, limiting the upward movement of the bar so that it does not move up beyond the position shown in Fig. 6. In this position the cam member is located to receive the pin 50ª in the slot portion as the scale returns to a normal position. The spring 51ª operates lever 48 so pin 50ª enters the slot portion 46.

An operating extension or link 70 is pivotally connected to the upper end of the bar or rod 53 and extends upward to the vicinity of the display device 35 where it connects to a pivoted arm 71 which carries a pawl 72 cooperating with a toothed wheel 73 that drives the display device 35. In the preferred arrangement the arm 71 is pivotally carried on the shaft 16 which carries the indicator 15 and display device 35. The pawl 72 is mounted on the outer end of the arm 71 by a pivot pin 75 and a spring 76 acts to normally yieldingly urge the pawl inward into engagement with the toothed member 73. The toothed member 73 is mounted concentric with the display device 35. The pawl 72 engages and cooperates with the teeth 78 of the member 73 so that upon upward movement of the arm 71 the toothed member 73 is rotated in the direction indicated by the arrow in Fig. 10, but when the arm 71 is moved down the pawl drags over the teeth without turning the member 73. In practice the teeth 78 are provided with recesses 79 to receive the end of the pawl to prevent the pawl from slipping from the teeth as the member 73 is driven by the pawl.

With the mechanism just described when the latch head 52 is released from the arm 50 through cooperation of the abutment 51 and cam surface 54, the spring 41 having the energy stored in it as above described moves the bar 63 upward rapidly and through the link 70 the arm 71 is rapidly moved upward. The rapid upward movement of the arm 71 moves the pawl 72 so that it rapidly moves the member 73 starting it to spin and as it spins it carries the display device with it. When the upward movement of the arm 71 stops, the member 73 with the display device is free to spin or continue to turn until the kinetic energy in them is dissipated. The teeth 78 pass the pawl 72 and when the parts finally come to rest the pawl 72 takes a position in the notch 79 of one of the teeth so the mechanism is ready for another operation.

Through the mechanism that I have just described the display device 35 is spun and is allowed to turn free after being started in motion. However, it is to be understood that the parts may be arranged, proportioned and related so that the display device is moved a predetermined amount for each operation and is not spun in the manner that I have described.

From the foregoing description and from the drawings it will be understood how the entire scale mechanism, apart from the platform, may be and preferably is housed entirely within the frame of the scale and how the entire mechanism that I have provided is housed within the scale. Considering my present invention broadly I may connect my mechanism to any moving part of the scale and in the case illustrated I have connected it to a moving part of the mechanism connecting the platform and indicator. In the particular arrangement that I have shown and described my entire mechanism is housed within the upper portion of the pedestal and within the head of the scale so that no parts are exposed and so that the display device 35 is the only part visible through the sight opening.

If desired a counter 90 may be operatively coupled with a suitable working part of the mechanism above described, as by a connecting rod 91, so that count is kept of the operations of the machine.

Having described a typical form of my invention and having described it in connection with a typical scale it will be understood how I have provided a display device in connection with a scale to be operated as the scale is operated but only during the initial period of operation of the scale, so that the display device does not burden the scale in any way to interfere with its accuracy or freedom of movement. In the case of a scale of the general character referred to the parts can be arranged and related so that the display device is operated only during the application of about 40 to 60 pounds to the platform of the scale, and any additional weight operates to move the indicator 15 and after the initial weight has been applied to move the display device all of the weight operates to move the indicator, and the display device is freed from the scale mechanism so that it does not impair it in any way.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In combination with a scale having a platform and an indicator operated from the platform, a display device and a drive between the display device and the scale including, an energy storing means including a latch controlling a spring, a mechanism acting to supply energy to said spring only during the initial operation of the scales and releasing the latch when the spring has received the supply of energy, and a drive between said means and the display device.

2. In combination with a scale having a platform and an indicator operated from the platform, a display device and a drive between the display device and the scale including, an energy storing means, a mechanism acting to supply energy to said means only during the initial operation of the scales, and a drive between said means and the display device including a latch holding said means against discharge of energy until it has received a predetermined amount of energy from said mechanism.

3. In combination with a scale having a platform and an indicator operated from the platform, a display device and a drive between the display device and the scale including, a spring, a mechanism acting to supply energy to the spring only during the initial operation of the scales, a latch normally restraining the spring, and cam means releasing the latch following said initial operation of the scales, and a drive between the spring and the display device including a ratchet allowing overtravel of the display device.

4. In combination with a scale having a platform and an indicator operated from the platform, a display device and a drive between the display device and the scale including, an energy storing means, a mechanism acting to supply energy to said means only during the initial operation of the scales, and a drive between said means and the display device, said means including a tension spring, a latch holding the spring against action, and means operable to release the latch after predetermined operation of the scale.

GEORGE MARSDEN.

REFERENCES CITED

The following references are of record in the file of this patent:

UNITED STATES PATENTS

| Number | Name | Date |
| --- | --- | --- |
| 859,223 | Howard | July 9, 1907 |